US009875543B2

(12) United States Patent
Ma et al.

(10) Patent No.: US 9,875,543 B2
(45) Date of Patent: Jan. 23, 2018

(54) TECHNIQUES FOR RECTIFICATION OF CAMERA ARRAYS

(71) Applicant: INTEL CORPORATION, Santa Clara, CA (US)

(72) Inventors: Tao Ma, Cincinnati, OH (US); Wei Sun, San Jose, CA (US); Oscar Nestares, San Jose, CA (US); Kalpana Seshadrinathan, Santa Clara, CA (US); Dinesh Jayaraman, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 308 days.

(21) Appl. No.: 13/710,294

(22) Filed: Dec. 10, 2012

(65) Prior Publication Data
US 2014/0160246 A1 Jun. 12, 2014

(51) Int. Cl.
H04N 13/02 (2006.01)
G06T 7/00 (2017.01)
G06T 7/80 (2017.01)

(52) U.S. Cl.
CPC ............ G06T 7/002 (2013.01); G06T 7/85 (2017.01); H04N 13/0242 (2013.01); H04N 13/0246 (2013.01); G06T 2207/10012 (2013.01)

(58) Field of Classification Search
CPC ............ G06T 7/002; H04N 13/0242; H04N 13/0239; H04N 5/247
USPC .......................................................... 348/47
See application file for complete search history.

(56) References Cited

U.S. PATENT DOCUMENTS

2006/0181610 A1 8/2006 Carlsson et al.
2011/0063417 A1* 3/2011 Peters et al. ................... 348/47
2012/0050494 A1* 3/2012 Chen et al. ..................... 348/48
2012/0081519 A1* 4/2012 Goma ................... H04N 5/247
348/47

OTHER PUBLICATIONS

U. R. Dhond, J. K. Aggarwal, Structure from Stereo—A Review, IEEE Trans. System, Man and Cybernetics, vol. 19, No. 6, Nov./Dec. 1989.
E.Trucco, A, Verri, Introductory Techniques for 3-D Computer Vision, Section 7.3.7, pp. 157-161, Prentice-Hall, Inc., 1998.
A. Fusiello, E. Trucco, A. Verri, "A Compact Algorithm for Rectification of Stereo Pairs", Machine Vision and Applications, Published 12:16-22, 2000, 8 pages.

(Continued)

Primary Examiner — Thai Tran
Assistant Examiner — Jose Mesa

(57) ABSTRACT

Techniques for rectification of camera arrays are described. In one embodiment, for example, an apparatus may comprise a processor circuit and an imaging management module, and the imaging management module may be operable on the processor circuit to determine a composite rotation matrix for a camera array comprising a plurality of cameras, determine a composite intrinsic parameter matrix for the camera array, and compute one or more rectification maps for the camera array based on the composite rotation matrix and the composite intrinsic parameter matrix, each of the one or more rectification maps corresponding to one of the plurality of cameras. Other embodiments are described and claimed.

25 Claims, 7 Drawing Sheets

(56) References Cited

OTHER PUBLICATIONS

Yun-Suk Kang, Cheon Lee, Yo-Sung Ho, "An Efficient Rectification Algorithm for Multi-View Images in Parallel Camera Array", Gwangju Institute of Science and Technology (GIST), Korea, 3DTV-CON'08, 4 pages, Istanbul, Turkey, May 28-30, 2008.
Extended European Search Report received for European Patent Application No. 13861842.6, dated Jun. 27, 2016, 14 pages.
Kang et al., "An efficient image rectification method for parallel multi-camera arrangement", IEEE Transactions on Consumer Electronics, vol. 57, No. 3, Aug. 1, 2011, 8 pages.

* cited by examiner

TECHNIQUES FOR RECTIFICATION OF CAMERA ARRAYS

BACKGROUND

In the field of image acquisition and processing, the use of more than one camera to capture images of a scene may enable the implementation of techniques for disparity and depth estimation, view interpolation, and three-dimensional reconstruction, for example. Such techniques may require determination of inter-image correspondences between pixel locations in images captured by the multiple cameras. In conventional two-camera or trinocular systems, image rectification is sometimes employed in order to simplify the determination of inter-image pixel location correspondences. Image rectification involves transforming one or more images such that for a particular pixel in a rectified first image captured by a first camera, a search for a corresponding pixel in a corresponding rectified second image captured by a second camera may be confined to a same pixel row or same pixel column of the rectified second image as that in which it appears in the rectified first image.

Although conventional techniques exist for rectification of images captured by stereo camera arrangements, no such techniques exist for rectification of images captured by camera arrays such as, for example, two-dimensional camera arrays. As such, techniques for rectification of images in camera arrays may be desirable.

DETAILED DESCRIPTION

Various embodiments may be generally directed to techniques for rectification of camera arrays. In one embodiment, for example, an apparatus may comprise a processor circuit and an imaging management module, and the imaging management module may be operable on the processor circuit to determine a composite rotation matrix for a camera array comprising a plurality of cameras, determine a composite intrinsic parameter matrix for the camera array, and compute one or more rectification maps for the camera array based on the composite rotation matrix and the composite intrinsic parameter matrix, each of the one or more rectification maps corresponding to one of the plurality of cameras. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
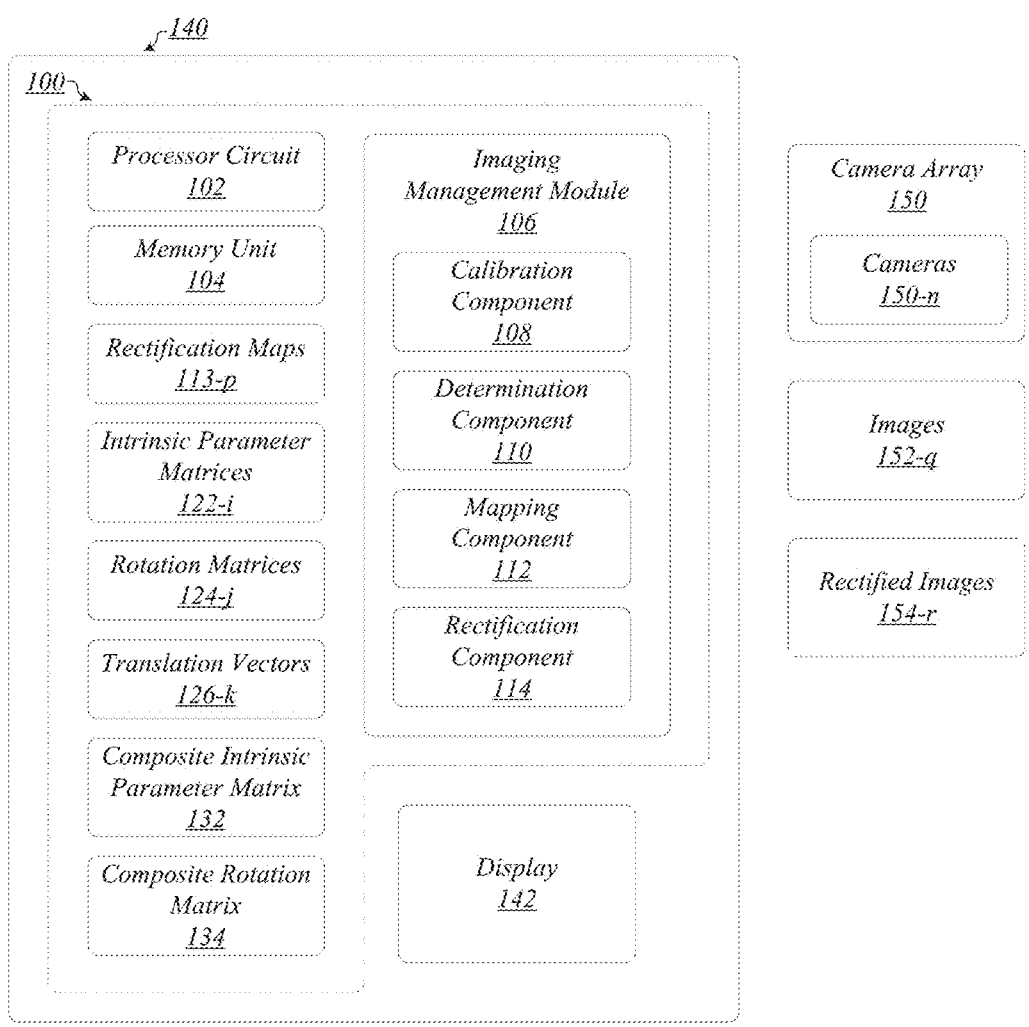
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and an imaging management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise an imaging management module 106. Imaging management module 106 may comprise logic, algorithms, and/or instructions operative to capture, process, edit, compress, store, print, and/or display one or more images. In some embodiments, imaging management module 106 may comprise programming routines, functions, and/or processes implemented as software within an imaging application or operating system. In various other embodiments, imaging management module 106 may be implemented as a standalone chip or integrated circuit, or as circuitry comprised within processor circuit 102 or within a graphics chip or other integrated circuit or chip. The embodiments are not limited in this respect.

FIG. 1 also illustrates a block diagram of a system 140. System 140 may comprise any of the aforementioned elements of apparatus 100. System 140 may further comprise a display 142. Display 142 may comprise any display device capable of displaying information received from processor circuit 102. Examples for display 142 may include a television, a monitor, a projector, and a computer screen. In one embodiment, for example, display 142 may be implemented by a liquid crystal display (LCD), light emitting diode (LED) or other type of suitable visual interface. Display 142 may comprise, for example, a touch-sensitive color display screen. In various implementations, display 142 may comprise one or more thin-film transistors (TFT) LCD including embedded transistors. In various embodiments, display 142 may be arranged to display a graphical user interface operable to directly or indirectly control imaging management module 106. For example, in some embodiments, display 142 may be arranged to display a graphical user interface generated by an imaging application implementing imaging management module 106. In such embodiments, the graphical user interface may enable operation of imaging management module 106 to capture, process, edit, compress, store, print, and/or display one or more images. The embodiments, however, are not limited to these examples.

In some embodiments, apparatus 100 and/or system 140 may be configurable to communicatively couple with a camera array 150. Camera array 150 may comprise a plurality of cameras 150-*n*. It is worthy of note that "n" and similar designators as used herein are intended to be variables representing any positive integer. Thus, for example, if an implementation sets a value for n=4, then a complete set of cameras 150-*n* may include cameras 150-1, 150-2, 150-3, and 150-4. It is worthy of note that although camera array 150 is illustrated as being external to apparatus 100 and system 140 in FIG. 1, in some embodiments, camera array 150 may be comprised within apparatus 100 and/or system 140. The embodiments are not limited in this context.

In various embodiments, camera array 150 may comprise a planar camera array. A planar camera array may comprise a camera array in which the optical centers of the cameras therein are situated in—or approximately situated in—a common plane in three-dimensional space.

In some embodiments, camera array 150 may comprise a planar rectilinear camera array. A planar rectilinear camera array may comprise a planar camera array in which the optical centers of the cameras therein are situated in—or approximately situated in—a common plane in three-dimensional space, and lie on—or lie approximately on—one or more lines defining one or more rows and/or columns within the two-dimensional space of the common plane.

In various embodiments, the optical centers of cameras within a planar rectilinear camera array may be arranged in—or approximately arranged in—multiple rows and columns within their common plane. Hereinafter, a planar rectilinear camera array comprising multiple rows and columns within its common plane shall be referred to as a "two-dimensional (2D)" camera array. It is worthy of note that because the optical centers of the cameras within a planar rectilinear camera array may be situated approximately on—but not necessarily precisely on—the common plane, the actual arrangement of optical centers in a particular 2D camera array may be three-dimensional. It is also worthy of note that a particular camera array in which all optical centers reside exactly on a common plane does not constitute a 2D camera array—as defined herein—if its optical centers do not lie on or approximately on lines defining multiple rows and columns within that common plane.

Figure 2A:
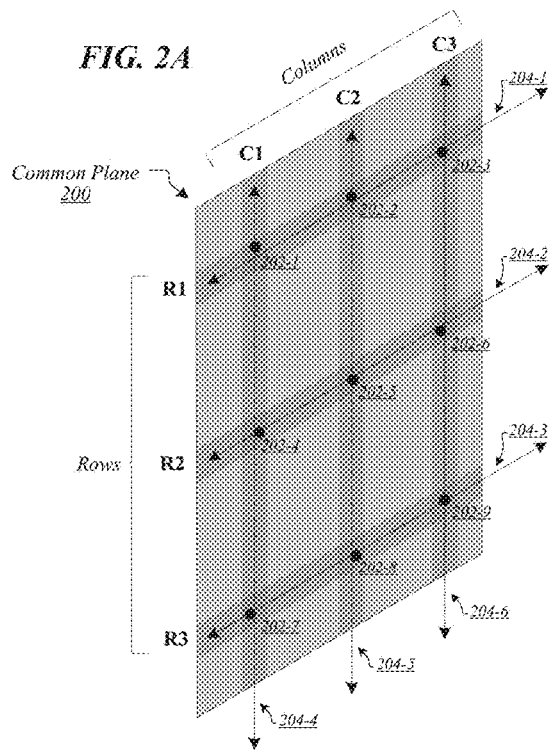
FIG. 2A illustrates one embodiment of a two-dimensional camera array.

An example of a 2D camera array is illustrated in FIG. 2A. As shown in FIG. 2A, a plurality of optical centers 202-*v* corresponding to a plurality of cameras (not shown) are approximately situated in common plane 200, and approximately lie on lines 204-*x* defining rows R1, R2, and R3 and columns C1, C2, and C3 within common plane 200. For example, the optical centers 202-1, 202-4, and 202-7 all lie approximately on line 204-4 defining column C1, and thus may be said to reside in column C1, and the optical centers 202-7, 202-8, and 202-9 all lie approximately on line 204-3 defining row R3, and thus may be said to reside in row R3. The embodiments are not limited to these examples. It is worthy of note that although nine optical centers arranged in three rows and three columns are featured in the example 2D camera array of FIG. 2A, 2D camera arrays comprising lesser or greater numbers of cameras and corresponding optical centers, rows, and columns are both possible and contemplated, and the embodiments are not limited in this context.

Some camera arrays 150 may comprise a plurality of cameras 150-*n* arranged such that their optical centers all lie or approximately lie on a single line in three-dimensional space. Hereinafter, a camera array 150 featuring such an arrangement shall be referred to as a "linear" camera array. It is worthy of note that since the optical centers in a linear camera array approximately lie on a single line, they must also approximately lie on a common plane. As such, linear camera array may be regarded as a planar rectilinear camera array comprising only a single row or column defined by the single line on which the cameras therein approximately reside. It is also worthy of note that because the optical centers of the cameras within a linear camera array may lie approximately on—but not necessarily exactly on—a single line, the actual arrangement of optical centers in a particular linear camera array may be two-dimensional or three-dimensional.

Figure 2B:
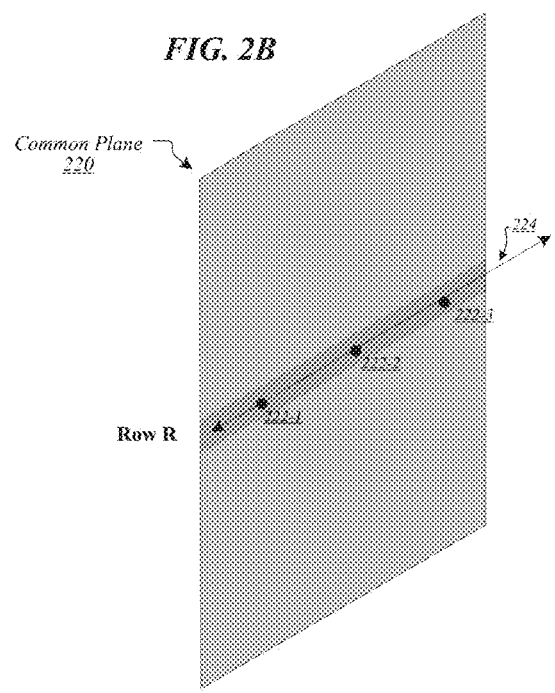
FIG. 2B illustrates one embodiment of a linear camera array.

An example of a linear camera array is illustrated in FIG. 2B. As shown in FIG. 2B, the optical centers 222-1, 222-2, and 222-3 approximately lie on line 224, and thus an arrangement of cameras (not shown) comprising the optical centers 222-1, 222-2, and 222-3 may comprise a linear camera array. As also illustrated in FIG. 2B, the line 224 lies within the common plane 220, and since each of the optical centers 222-1, 222-2, and 222-3 approximately lies on the line 224, each of the optical centers 222-1, 222-2, and 222-3 is approximately situated in the common plane 220. As such, an arrangement of cameras comprising the optical centers 222-1, 222-2, and 222-3 in FIG. 2B may also be regarded as a planar rectilinear camera array comprising only the single row R defined by the line 224. The embodiments are not limited to this example. It is worthy of note that although three optical centers are featured in the example linear camera array of FIG. 2B, linear camera arrays comprising greater numbers of cameras and corresponding optical centers are both possible and contemplated, and the embodiments are not limited in this context.

Returning to FIG. 1, in general operation, apparatus 100 and/or system 140 may be operative to perform image rectification for camera array 150. Performing image rectification for camera array 150 may comprise transforming one or more images 152-$q$ captured by one or more cameras 150-$n$ to obtain a set of one or more rectified images 154-$r$ in which corresponding pixels of rectified images 154-$r$ for cameras 150-$n$ residing in the same row of the camera array 150 will reside in the same pixel row, and corresponding pixels of rectified images 154-$r$ for cameras 150-$n$ residing in the same column of the camera array 150 will reside in the same pixel column. Image rectification may simplify the process of determining inter-image pixel location correspondences, by enabling searches for corresponding pixels to be confined within pixel rows and/or columns. The embodiments are not limited in this context.

In some embodiments, imaging management module 106 may comprise calibration component 108. Calibration component 108 may comprise logic, circuitry, algorithms, or instructions operative to determine a plurality of intrinsic and/or extrinsic parameters of the plurality of cameras 150-$n$ in camera array 150. These intrinsic and/or extrinsic parameters may describe properties of each of the plurality of cameras 150-$n$. The embodiments are not limited in this context.

In various embodiments, calibration component 108 may be operative to generate a plurality of rotation matrices 122-$i$ for the plurality of cameras 150-$n$ in camera array 150. In some such embodiments, calibration component 108 may be operative to generate a rotation matrix 122-$i$ for each camera 150-$n$ in camera array 150. Each rotation matrix 122-$i$ may indicate a relative rotation of an orientation of a particular camera 150-$n$ with respect to an arbitrary direction of a reference coordinate system. The orientation of any particular camera 150-$n$ may denote a direction towards which that camera 150-$n$ is pointed, aimed, targeted, or otherwise faces. More particularly, the orientation of any particular camera 150-$n$ may be defined as the direction defined by a line extending from the optical center of the camera 150-$n$ to the primary point on the focal plane of the camera 150-$n$. In various embodiments, calibration component 108 may be operative to store the plurality of rotation matrices 122-$i$ in memory unit 104.

Figure 3:
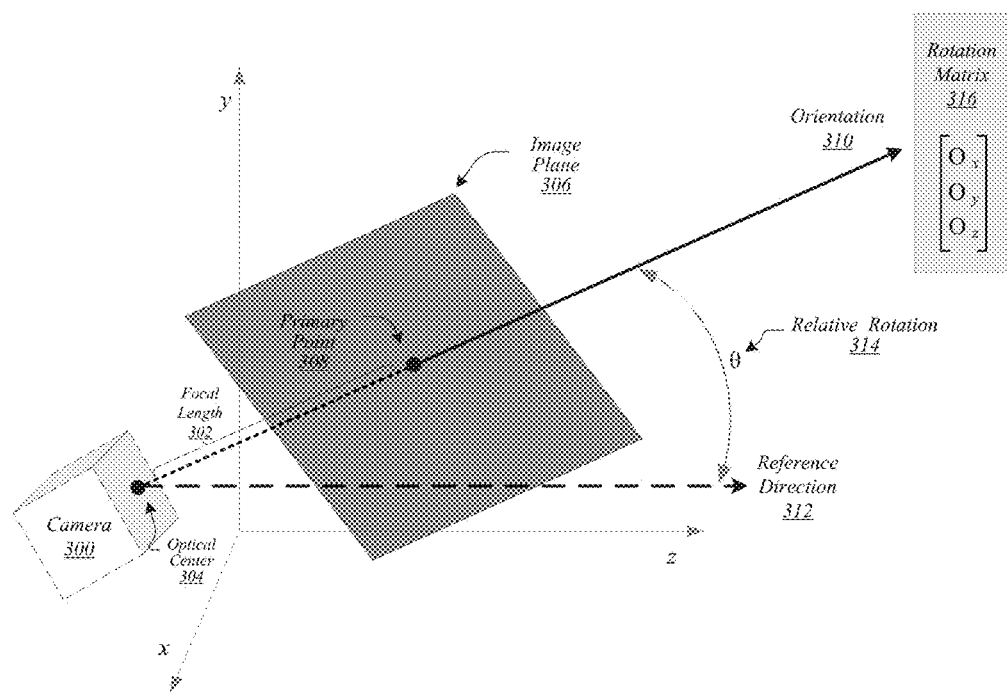
FIG. 3 illustrates one embodiment of a rotation matrix.

An example of a determination of a rotation matrix such as may be comprised by a rotation matrix 122-$i$ is illustrated in FIG. 3. As shown in FIG. 3, a reference coordinate system is defined that comprises x, y, and z directions. A focal length 302 comprises a line segment extending from the optical center 304 of a camera 300 to the image plane 306 of the camera 300. The focal length 302 is perpendicular to the image plane 306, and intersects the image plane 306 at the primary point 308. The orientation 310 of the camera 300 is defined as the direction represented by the extension of the focal length 302 from the optical center 304 to and past the primary point 308. In this example, an arbitrarily selected reference direction 312 is selected that comprises the z direction of the reference coordinate system. The angle θ comprises the relative rotation 314 of the orientation 310 of the camera 300 with respect to the reference direction 312 of the reference coordinate system. A rotation matrix 316 for the camera 300 indicates the relative rotation 314 by expressing the orientation 310 in the form of a matrix of unit vectors describing the orientation 310 according to the reference coordinate system. In the example of FIG. 3, the rotation matrix 316 for the camera 300 is in the form:

$$R_{316} = [O_x, O_y, O_z]^T;$$

where $O_x$, $O_y$, and $O_z$ comprise the unit vector coefficients representing the x, y, and z components of the orientation 310 according to the reference coordinate system, T represents the vector transpose operation, and $R_{316}$ represents the rotation matrix 316 for the camera 300. The embodiments are not limited to this example.

In some embodiments, calibration component 108 may be operative to generate a plurality of intrinsic parameter matrices 124-$j$ for the plurality of cameras 150-$n$ in camera array 150. In various such embodiments, calibration component 108 may be operative to determine an intrinsic parameter matrix 124-$j$ for each camera 150-$n$ in camera array 150. In some embodiments, each intrinsic parameter matrix 124-$j$ may comprise one or more parameters describing intrinsic properties of a corresponding camera 150-$n$. In various embodiments, intrinsic properties described by parameters in intrinsic parameter matrices 124-$j$ may include focal lengths, principal points, and skews of one or more cameras 150-$n$. In some embodiments, calibration component 108 may be operative to store the plurality of intrinsic parameter matrices 124-$j$ in memory unit 104. In various embodiments, calibration component 108 may be operative to generate the plurality of intrinsic parameter matrices 124-$j$ for the plurality of cameras 150-$n$ in camera array 150 prior to generating the plurality of rotation matrices 122-$i$ for the plurality of cameras 150-$n$ in camera array 150. In some such embodiments, calibration component 108 may then be operative to generate the plurality of rotation matrices 122-$i$ using the plurality of intrinsic parameter matrices 124-$j$. In an example embodiment, calibration component 108 may be operative to generate a plurality of intrinsic parameter matrices 124-$j$ comprising focal lengths and principal points of cameras 150-$n$, and then to generate a plurality of rotation matrices 122-$i$ for cameras 150-$n$ using those focal lengths and principal points. The embodiments are not limited to this example.

In various embodiments, calibration component 108 may be operative to generate a plurality of translation vectors 126-$k$ for the plurality of cameras 150-$n$ in camera array 150. In some such embodiments, calibration component 108 may be operative to determine a translation vector 126-$k$ for each camera 150-$n$ in camera array 150. In various embodiments, each translation vector 126-$k$ may comprise a difference between the coordinates of the optical center of a particular camera 150-$n$ according to a reference coordinate system and the coordinates of an arbitrary point within the reference coordinate system. In some such embodiments, the origin of the coordinate axes in the reference coordinate system may be selected as the arbitrary point, and thus each translation vector 126-$k$ may comprise the coordinates of the optical center of a particular camera 150-$n$ according to the reference coordinate system. In various embodiments, the optical center of a particular reference camera 150-$n$ may be selected as the origin of the reference coordinate system and as the arbitrary point therein, and thus each translation vector 126-$k$ may indicate the location of the optical center of a camera 150-$n$ with respect to the optical center of the reference camera 150-$n$. In some embodiments, calibration component 108 may be operative to store the plurality of translation vectors 126-$k$ in memory unit 104. The embodiments are not limited in this context.

In various embodiments, imaging management module 106 may comprise determination component 110. Determination component 110 may comprise logic, circuitry, algorithms, or instructions operative to determine a composite rotation matrix 132 for camera array 150. In some embodiments, determination component 110 may be operative to determine a composite orientation for camera array 150 based on the plurality of translation vectors 126-k generated by calibration component 108 for the plurality of cameras 150-n in camera array 150. The plurality of translation vectors 126-k may comprise—or be operative to determine—a plurality of reference coordinates indicating the locations of a plurality of optical centers according to the reference coordinate system, and each of the optical centers may correspond to a particular one of the plurality of cameras 150-n. In various such embodiments, determination component 110 may be operative to determine a composite rotation matrix 132 for camera array 150 based on a difference between the composite orientation of camera array 150 in the reference coordinate system and a reference direction in the reference coordinate system.

In some embodiments, camera array 150 may comprise a 2D camera array, and determination component 110 may be operative to fit a plane to the optical centers of the plurality of cameras 150-n within camera array 150 based on the reference coordinates of those optical centers according to the reference coordinate system. Hereinafter, this plane will be referred to as the "array plane." In various embodiments, determination component 110 may be operative to determine the reference coordinates of the optical centers of the plurality of cameras 150-n based on the plurality of translation vectors 126-k. In an example embodiment, determination component 110 may be operative to determine, for each optical center, reference coordinates in the form $(x_i, y_i, z_i)$ that describe the location of that optical center according to a reference coordinate system comprising x, y, and z dimensions. Determination component 110 may then be operative to determine an array plane defined by parameters a, b, and c. More particularly, determination component 110 may be operative to determine an array plane defined by the equation:

$$z = ax + by + c$$

where x, y and z represent coordinates in the x, y and z dimensions of the reference coordinate system, and a, b, and c are constants. In various embodiments, in order to determine the values of a, b, and c, determination component 110 may be operative to perform least square error minimization according to the equation:

$$E = \sum_{i=1}^{N}(ax_i + by_i + c - z_i)^2$$

where $x_i$, $y_i$ and $z_i$ represent the coordinates of the ith optical center according to the reference coordinate system and E represents the sum of the squares of the distances between each optical center and a plane defined by the parameters a, b, and c. In some embodiments, determination component 110 may be operative to determine the parameters a, b, and c by solving a system of linear equations in the variables a, b, and c obtained by setting the partial derivative of E with respect to each of a, b, and c equal to zero. The embodiments are not limited to this example. In various embodiments, after determining the array plane, determination component 110 may be operative to define the composite orientation of the camera array 150 as a direction in the reference coordinate system that is perpendicular to the array plane. The embodiments are not limited in this context.

In some embodiments in which camera array 150 comprises a 2D camera array, determination component 110 may be operative to fit one or more lines within the array plane to the plurality of optical centers of cameras 150-n and to define an array coordinate system based on the one or more lines and on the composite orientation of the camera array 150. In various embodiments, each of the one or more lines may be either parallel to or perpendicular to each other line among the one or more lines. In some embodiments, determination component 110 may be operative to fit a set of lines to the rows of optical centers in camera array 150, the set of lines defined by the equation:

$$y_i = mx + d_i; \ i = 1 \text{ to } N_r$$

where m represents a slope in x and y dimensions within the array plane, the slope common to each of the set of lines, $d_i$ represents a displacement of the ith line in the y dimension, $N_r$ represents the number of rows in the camera array 150, and $y_i$ represents a coordinate value in the y dimension. In various embodiments, determination component 110 may be operative to perform least square error minimization to determine the values of m and $d_1 \ldots d_{N_r}$. The embodiments are not limited in this context.

In some other embodiments, instead of fitting lines to rows of optical centers of cameras 150-n within camera array 150, determination component 110 may be operative to fit lines to columns of optical centers of cameras 150-n within camera array 150. In yet other embodiments, determination component 110 may be operative both to fit lines to rows of optical centers and to fit lines to columns of optical centers of cameras 150-n within camera array 150. In various such embodiments, determination component 110 may be operative to fit lines to rows and columns independently, determine least square errors associated with both fits, and use the value of m determined by the fit that exhibits the smaller least square error.

In some embodiments, determination component 110 may be operative to define an array coordinate system based on the determined values of a, b, c, and m. In various embodiments, determination component 110 may be operative to define an array coordinate system comprising a coordinate dimension perpendicular to the array plane and two perpendicular coordinate dimensions in the array plane defined by unit vectors:

$$x = [1, m, a + bm] \text{ and}$$

$$y = [1, m', a + bm']$$

where $m' = -(1 + a^2 + abm)/(m + ab + b^2m)$

In some embodiments, camera array 150 may comprise a linear camera array, and determination component 110 may be operative to fit a line to a plurality of optical centers of the cameras 150-n within camera array 150 based on the reference coordinates of those optical centers according to the reference coordinate system. In various embodiments, determination component 110 may be operative to fit a line to the plurality of optical centers using least square error minimization. In some embodiments, determination component may define an array coordinate system comprising a coordinate dimension defined by the line and two coordinate dimensions perpendicular to the line and to each other. In various embodiments, one of the two coordinate dimensions may comprise a z dimension of the reference coordinate system. The embodiments are not limited in this context.

In some embodiments, determination component 110 may be operative to determine a composite rotation matrix for the camera array 150 based on a difference between the composite orientation of the camera array 150 and a reference direction in the reference coordinate system. In various such embodiments, the reference direction may comprise a z direction in the reference coordinate system. In some embodiments, determination component 110 may be operative to determine the composite rotation matrix such that when a direction expressed in terms of unit dimensional vectors of the reference coordinate system is multiplied by the composite rotation matrix, the result will be a vector identifying the direction in terms of the array coordinate system and relative to the composite orientation of the camera array 150. The embodiments are not limited in this context.

In various embodiments, determination component 110 may be operative to determine a composite intrinsic parameter matrix 134 for camera array 150. In some embodiments, determination component 110 may be operative to determine a composite intrinsic parameter matrix 134 for camera array 150 based on a plurality of intrinsic parameter matrices 124-*j* generated by calibration component 108 for the plurality of cameras 150-*n* in camera array 150. In various such embodiments, determination component 110 may be operative to determine a composite intrinsic parameter matrix 134 for camera array 150 by computing an average of the intrinsic parameter matrices 124-*j* for each camera 150-*n* in camera array 150. In an example embodiment, determination component 110 may be operative to determine a composite intrinsic parameter matrix 134 for camera array 150 according to the equation:

$$K = 1/N \sum_{i=1}^{N} K_i;$$

where N represents then number of cameras 150-*n* in camera array 150, $K_i$ represents the intrinsic parameter matrix 124-*j* corresponding to the ith camera in camera array 150, and K represents the composite intrinsic parameter matrix 134 for camera array 150. The embodiments are not limited in this context.

In various embodiments, imaging management module 106 may comprise mapping component 112. Mapping component 112 may comprise logic, circuitry, algorithms, or instructions operative to generate one or more rectification maps 113-*p*. In some embodiments, mapping component 112 may be operative to generate one rectification map 113-*p* for each camera 150-*n* within camera array 150. In other embodiments, mapping component 112 may be operative to generate a number of rectification maps 113-*p* that is less than the number of cameras 150-*n* within camera array 150. In an example embodiment, mapping component 112 may be operative to define a particular reference camera 150-*n* for which rectification is not required, and may not generate a rectification map 113-*p* for that reference camera 150-*n*. In various embodiments, mapping component 112 may be operative to pre-calculate and store the one or more rectification maps 113-*p* in memory unit 104 following a calibration of camera array 150. The embodiments are not limited in this context.

In some embodiments, each rectification map 113-*p* may comprise logic, information, data, or instructions usable to determine coordinates in an original image 152-*q* captured by a particular camera 150-*n* that correspond to pixels in a rectified image corresponding to the original image 152-*q*. In various embodiments, mapping component 112 may be operative to generate the one or more rectification maps 113-*p* according to the homography given by:

$$m_i = [u v 1]^T$$

$$m_i^{new} = (KR)(K_i R_i)^{-1} m_i^{old}$$

where K represents the composite intrinsic parameter matrix, R represents the composite rotation matrix, $K_i$ represents the intrinsic parameter matrix of the ith camera, $R_i$ represents the rotation matrix of the ith camera, $m_i$ represents the homogenous coordinates of pixels on the ith camera's image plane, and $m_i^{old}$ and $m_i^{new}$ represent the homogenous coordinates before and after rectification, respectively. The embodiments are not limited in this context.

In some embodiments, apparatus 100 and/or system 140 may be operative to receive a plurality of images 152-*q* for rectification. The plurality of images 152-*q* may be received from the plurality of cameras 150-*n* and may comprise images captured by the plurality of cameras 150-*n*. In various embodiments, each of the plurality of images 152-*q* may comprise an image captured by a corresponding camera 150-*n* in camera array 150. In some such embodiments, the plurality of images 152-*q* may comprise a number of images equal to the number of cameras 150-*n* in camera array 150 and captured substantially simultaneously by the plurality of cameras 150-*n* in camera array 150. The embodiments are not limited in this context.

In various embodiments, imaging management module 106 may comprise rectification component 114. Rectification component 114 may be operative to retrieve one or more rectification maps 113-*p* from memory unit 104 and rectify the plurality of images 152-*q* using the one or more rectification maps 113-*p*. In some embodiments, in order to populate any particular pixel of a rectified version of a particular image 152-*q* captured by a camera 150-*n*, rectification component 114 may be operative to determine coordinates in the original image the correspond to the particular pixel in the rectified image using the rectification map 113-*p* for that camera 150-*n*. In various embodiments, rectification component 114 may be operative to interpolate pixel values of two or more pixels in a particular image 152-*q* to determine a pixel value for a pixel in a rectified version of the image 152-*q*. In some such embodiments, rectification component 114 may be operative to select the two or more pixels in the particular image 152-*q* based on coordinates in the original image determined using the rectification map 113-*p* for the camera 150-*n* that captured the particular image 152-*q*. The embodiments are not limited in this context.

In various embodiments, a camera array 150 may be simulated by moving a single camera to different spatial locations corresponding to the locations of the nominal cameras 150-*n* in the planar rectilinear grid of the simulated camera array 150, capturing images from each of the different spatial locations, and rectifying the captured images. In some such embodiments, since the moving camera will merely undergo a linear translation when moving within the planar rectilinear grid, the individual rotation matrix corresponding to each spatial location of the moving camera will be the same. As such, a single rotation matrix 124-*j* may be determined and used for the moving camera. In various embodiments, determining the single rotation matrix 124-*j* for the moving camera may comprise capturing images 152-*q* of a defined calibration pattern from different locations within the planar rectilinear grid and determining the single rotation matrix 124-*j* based on error measurements for the captured images 152-*q* with respect to the known calibration pattern. In some embodiments, the calibration pattern may comprise a chessboard pattern. In various embodiments, the focal plane of the moving camera may be aligned with the planar rectilinear grid along which the moving camera moves. In some embodiments, an iterative procedure may be used to determine a deviation of an orientation of the moving camera with respect to the direction perpendicular to the planar rectilinear grid and to rotate the moving camera such that its orientation is perpendicular to the planar rectilinear grid. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
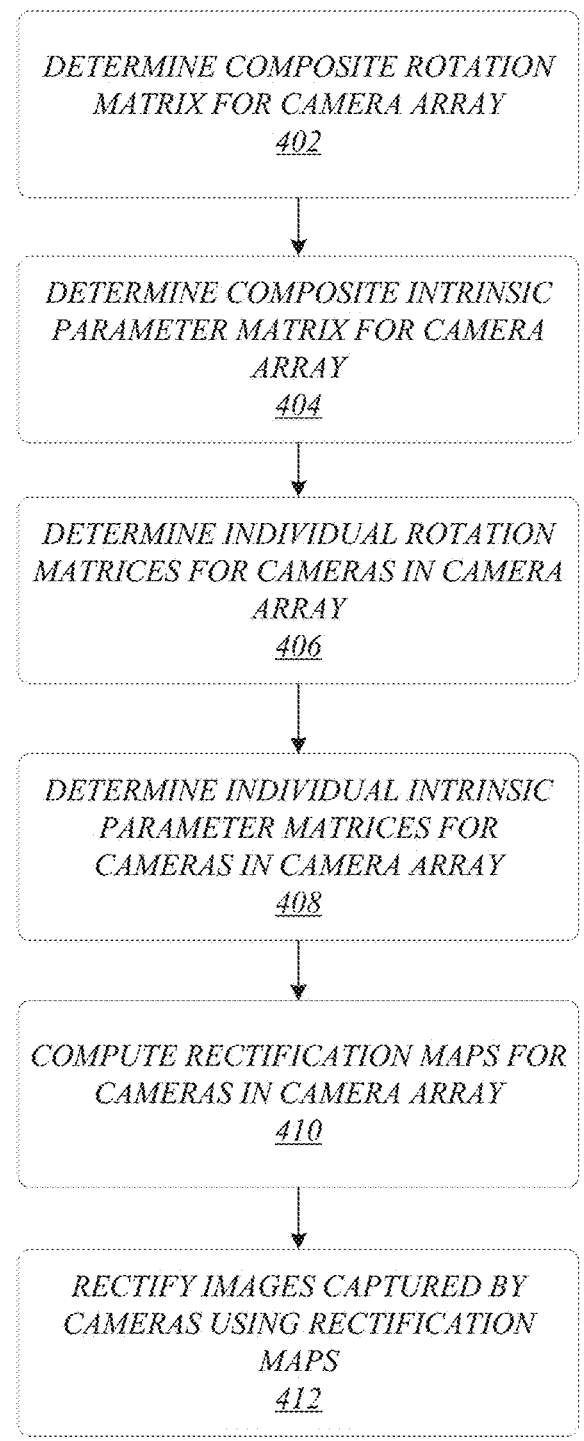
FIG. 4 illustrates one embodiment of a logic flow.

FIG. 4 illustrates one embodiment of a logic flow 400, which may be representative of the operations executed by one or more embodiments described herein. As shown in logic flow 400, a composite rotation matrix for a camera array may be determined at 402. For example, determination component 110 of FIG. 1 may determine composite rotation matrix 134 for camera array 150. At 404, a composite intrinsic parameter matrix for a camera array may be determined. For example, determination component 110 of FIG. 1 may determine composite intrinsic parameter matrix 132 for camera array 150. At 406, individual rotation matrices for the cameras in the camera array may be determined. For example, determination component 110 of FIG. 1 may determine individual rotation matrices 124-$j$ for cameras 150-$n$ in camera array 150. At 408, individual intrinsic parameter matrices for the cameras in the camera array may be determined. For example, determination component 110 of FIG. 1 may determine individual intrinsic parameter matrices 122-$i$ for cameras 150-$n$ in camera array 150. At 410, rectification maps may be computed for the cameras in the camera array. For example, mapping component 112 of FIG. 1 may compute rectification maps 113-$p$ for the cameras 150-$n$ in camera array 150 based on composite rotation matrix 134, composite intrinsic parameter matrix 132, individual rotation matrices 124-$j$, and intrinsic parameter matrices 122-$i$. At 412, images captured by the cameras may be rectified using the rectification maps. For example, rectification component 114 of FIG. 1 may rectify images 152-$q$ captured by cameras 150-$n$ using rectification maps 113-$p$. The embodiments are not limited to these examples.

Figure 5:
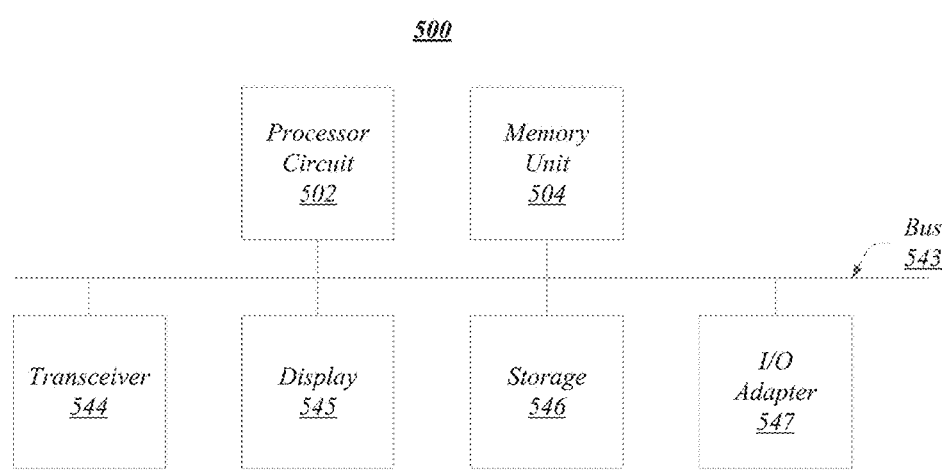
FIG. 5 illustrates one embodiment of a second system

FIG. 5 illustrates one embodiment of a system 500. In various embodiments, system 500 may be representative of a system or architecture suitable for use with one or more embodiments described herein, such as apparatus 100 and/or system 140 of FIG. 1 and/or logic flow 400 of FIG. 4. The embodiments are not limited in this respect.

As shown in FIG. 5, system 500 may include multiple elements. One or more elements may be implemented using one or more circuits, components, registers, processors, software subroutines, modules, or any combination thereof, as desired for a given set of design or performance constraints. Although FIG. 5 shows a limited number of elements in a certain topology by way of example, it can be appreciated that more or less elements in any suitable topology may be used in system 500 as desired for a given implementation. The embodiments are not limited in this context.

In various embodiments, system 500 may include a processor circuit 502. Processor circuit 502 may be implemented using any processor or logic device, and may be the same as or similar to processor circuit 102 of FIG. 1.

In one embodiment, system 500 may include a memory unit 504 to couple to processor circuit 502. Memory unit 504 may be coupled to processor circuit 502 via communications bus 543, or by a dedicated communications bus between processor circuit 502 and memory unit 504, as desired for a given implementation. Memory unit 504 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 500 may include a transceiver 544. Transceiver 544 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 544 may operate in accordance with one or more applicable standards in any version. The embodiments are not limited in this context.

In various embodiments, system 500 may include a display 545. Display 545 may constitute any display device capable of displaying information received from processor circuit 502, and may be the same as or similar to display 142 of FIG. 1.

In various embodiments, system 500 may include storage 546. Storage 546 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 546 may include technology to increase the storage performance enhanced protection for valuable digital media when multiple hard drives are included, for example. Further examples of storage 546 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 500 may include one or more I/O adapters 547. Examples of I/O adapters 547 may include Universal Serial Bus (USB) ports/adapters, IEEE 1394 Firewire ports/adapters, and so forth. The embodiments are not limited in this context.

Figure 6:
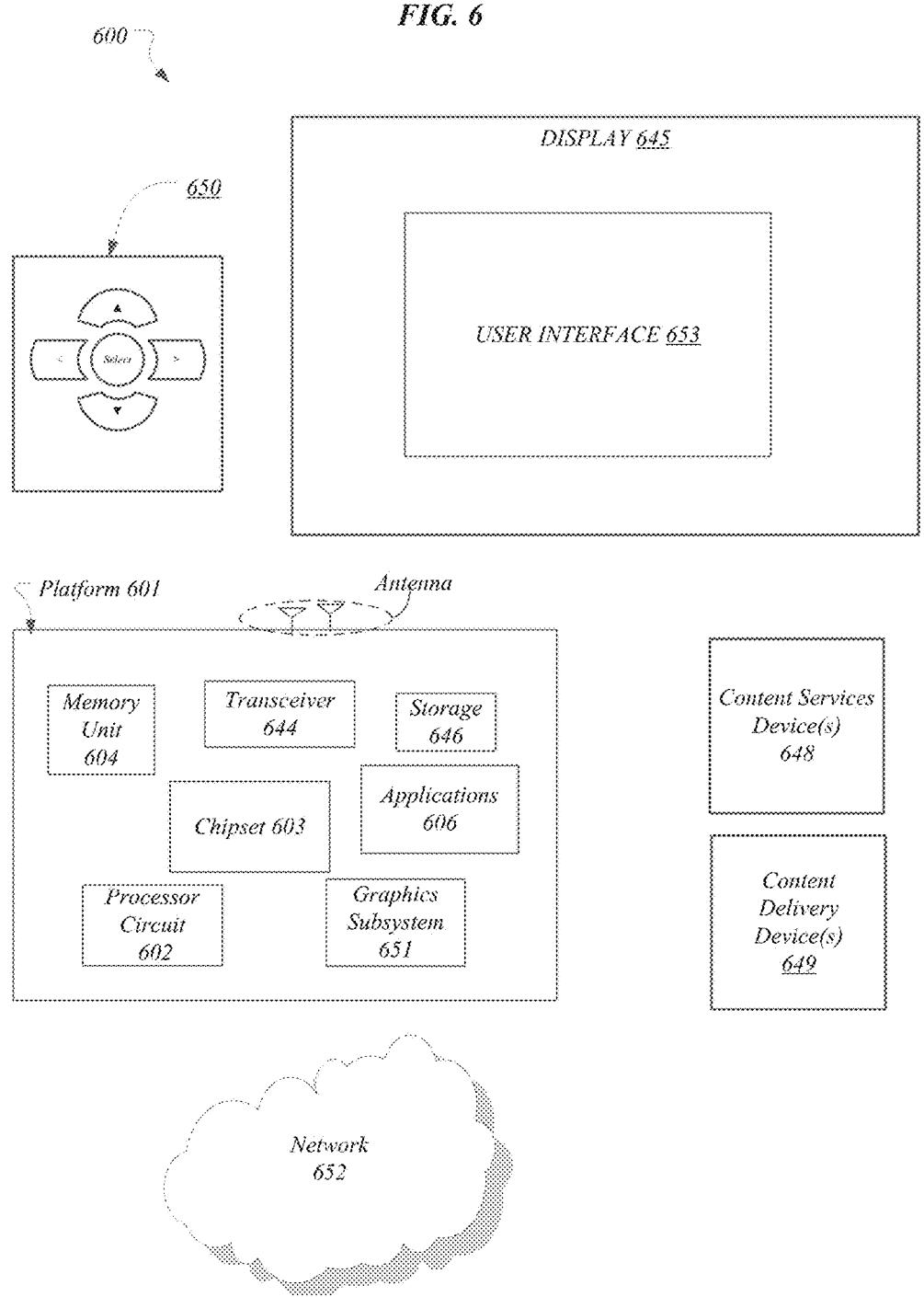
FIG. 6 illustrates one embodiment of a third system.

FIG. 6 illustrates an embodiment of a system 600. In various embodiments, system 600 may be representative of a system or architecture suitable for use with one or more embodiments described herein, such as apparatus 100 and/or system 140 of FIG. 1, logic flow 400 of FIG. 4, and/or system 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 includes a platform 601 coupled to a display 645. Platform 601 may receive content from a content device such as content services device(s) 648 or content delivery device(s) 649 or other similar content sources. A navigation controller 650 including one or more navigation features may be used to interact with, for example, platform 601 and/or display 645. Each of these components is described in more detail below.

In embodiments, platform 601 may include any combination of a processor circuit 602, chipset 603, memory unit 604, transceiver 644, storage 646, applications 651, and/or graphics subsystem 652. Chipset 603 may provide intercommunication among processor circuit 602, memory unit 604, transceiver 644, storage 646, applications 651, and/or graphics subsystem 652. For example, chipset 603 may include a storage adapter (not depicted) capable of providing intercommunication with storage 646.

Processor circuit 602 may be implemented using any processor or logic device, and may be the same as or similar to processor circuit 502 in FIG. 5.

Memory unit 604 may be implemented using any machine-readable or computer-readable media capable of storing data, and may be the same as or similar to memory unit 504 in FIG. 5.

Transceiver 644 may include one or more radios capable of transmitting and receiving signals using various suitable wireless communications techniques, and may be the same as or similar to transceiver 544 in FIG. 5.

Display 645 may include any television type monitor or display, and may be the same as or similar to display 545 in FIG. 5.

Storage 646 may be implemented as a non-volatile storage device, and may be the same as or similar to storage 546 in FIG. 5.

Graphics subsystem 652 may perform processing of images such as still or video for display. Graphics subsystem 652 may be a graphics processing unit (GPU) or a visual processing unit (VPU), for example. An analog or digital interface may be used to communicatively couple graphics subsystem 652 and display 645. For example, the interface may be any of a High-Definition Multimedia Interface, DisplayPort, wireless HDMI, and/or wireless HD compliant techniques. Graphics subsystem 652 could be integrated into processor circuit 602 or chipset 603. Graphics subsystem 652 could be a stand-alone card communicatively coupled to chipset 603.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 648 may be hosted by any national, international and/or independent service and thus accessible to platform 601 via the Internet, for example. Content services device(s) 648 may be coupled to platform 601 and/or to display 645. Platform 601 and/or content services device(s) 648 may be coupled to a network 653 to communicate (e.g., send and/or receive) media information to and from network 653. Content delivery device(s) 649 also may be coupled to platform 601 and/or to display 645.

In embodiments, content services device(s) 648 may include a cable television box, personal computer, network, telephone, Internet enabled devices or appliance capable of delivering digital information and/or content, and any other similar device capable of unidirectionally or bidirectionally communicating content between content providers and platform 601 and/display 645, via network 653 or directly. It will be appreciated that the content may be communicated unidirectionally and/or bidirectionally to and from any one of the components in system 600 and a content provider via network 653. Examples of content may include any media information including, for example, video, music, medical and gaming information, and so forth.

Content services device(s) 648 receives content such as cable television programming including media information, digital information, and/or other content. Examples of content providers may include any cable or satellite television or radio or Internet content providers. The provided examples are not meant to limit embodiments of the invention.

In embodiments, platform 601 may receive control signals from navigation controller 650 having one or more navigation features. The navigation features of navigation controller 650 may be used to interact with a user interface 654, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 650 may be echoed on a display (e.g., display 645) by movements of a pointer, cursor, focus ring, or other visual indicators displayed on the display. For example, under the control of software applications 651, the navigation features located on navigation controller 650 may be mapped to virtual navigation features displayed on user interface 654. In embodiments, navigation controller 650 may not be a separate component but integrated into platform 601 and/or display 645. Embodiments, however, are not limited to the elements or in the context shown or described herein.

In embodiments, drivers (not shown) may include technology to enable users to instantly turn on and off platform 601 like a television with the touch of a button after initial boot-up, when enabled, for example. Program logic may allow platform 601 to stream content to media adaptors or other content services device(s) 648 or content delivery device(s) 649 when the platform is turned "off." In addition, chip set 603 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 600 may be integrated. For example, platform 601 and content services device(s) 648 may be integrated, or platform 601 and content delivery device(s) 649 may be integrated, or platform 601, content services device(s) 648, and content delivery device(s) 649 may be integrated, for example. In various embodiments, platform 601 and display 645 may be an integrated unit. Display 645 and content service device(s) 648 may be integrated, or display 645 and content delivery device(s) 649 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 601 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
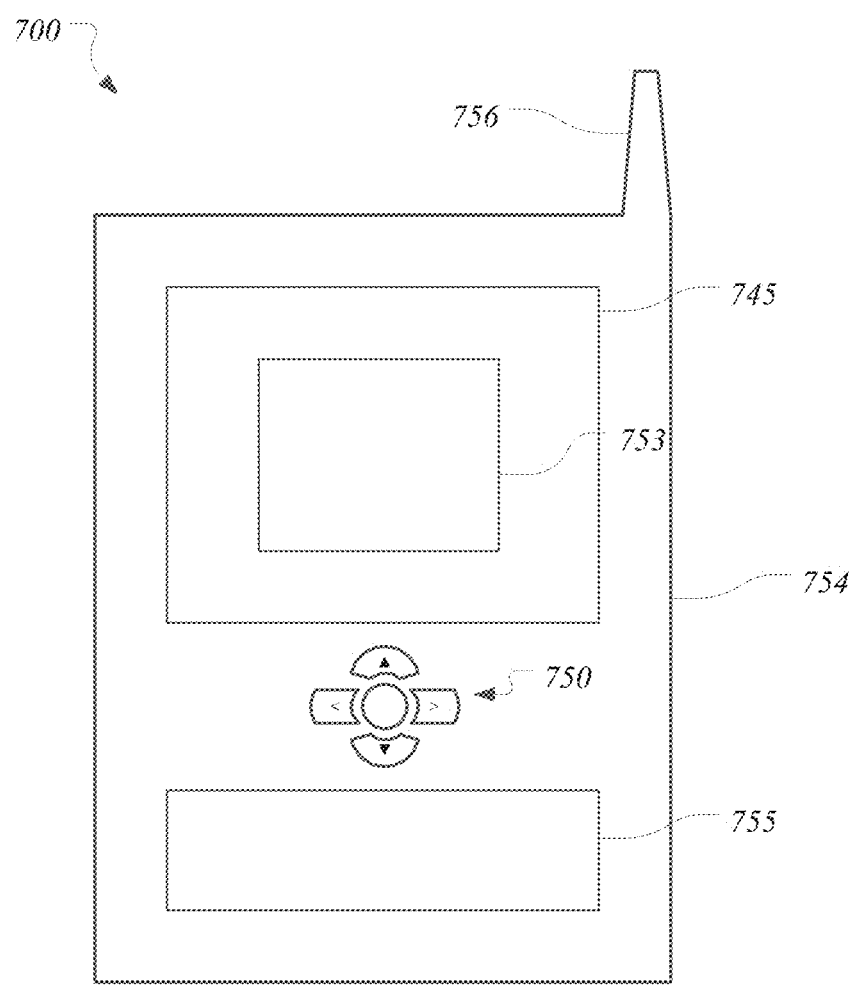
FIG. 7 illustrates one embodiment of a device.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a display 745, a navigation controller 750, a user interface 754, a housing 755, an I/O device 756, and an antenna 757. Display 745 may include any suitable display unit for displaying information appropriate for a mobile computing device, and may be the same as or similar to display 645 in FIG. 6. Navigation controller 750 may include one or more navigation features which may be used to interact with user interface 754, and may be the same as or similar to navigation controller 650 in FIG. 6. I/O device 756 may include any suitable I/O device for entering information into a mobile computing device. Examples for I/O device 756 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores"

may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

At least one machine-readable medium may comprise a plurality of instructions that, in response to being executed on a computing device, cause the computing device to determine a composite rotation matrix for a camera array comprising a plurality of cameras, determine a composite intrinsic parameter matrix for the camera array, and compute one or more rectification maps for the camera array based on the composite rotation matrix and the composite intrinsic parameter matrix, each of the one or more rectification maps corresponding to one of the plurality of cameras.

Such at least one machine-readable medium may comprise instructions that, in response to being executed on the computing device, cause the computing device to determine a composite orientation of the camera array according to a reference coordinate system based on a plurality of reference coordinates indicating the locations of a plurality of optical centers according to the reference coordinate system, each of the plurality of optical centers corresponding to a particular one of the plurality of cameras, and determine the composite rotation matrix for the camera array based on a difference between the composite orientation and a reference direction in the reference coordinate system.

With respect to such at least one machine-readable medium, the camera array may comprise a two-dimensional (2D) camera array, and determining the composite orientation of the camera array may comprise fitting a plane to the plurality of optical centers based on the plurality of reference coordinates and defining the composite orientation of the camera array as a direction in the reference coordinate system that is perpendicular to the plane.

Such at least one machine-readable medium may comprise instructions that, in response to being executed on the computing device, cause the computing device to fit one or more lines to the plurality of optical centers, each of the one or more lines located in the plane and either parallel to or perpendicular to each other line among the one or more lines, and define an array coordinate system based on the one or more lines and the composite orientation of the camera array.

With respect to such at least one machine-readable medium, the camera array may comprise a linear camera array, and determining the composite orientation of the camera array may comprise fitting a line to the plurality of optical centers based on the plurality of reference coordinates and defining the composite orientation of the camera array as a direction in the reference coordinate system that is perpendicular to the line.

Such at least one machine-readable medium may comprise instructions that, in response to being executed on the computing device, cause the computing device to determine an individual rotation matrix and an individual intrinsic parameter matrix for each of the plurality of cameras.

Such at least one machine-readable medium may comprise instructions that, in response to being executed on the computing device, cause the computing device to compute a rectification map corresponding to one of the plurality of cameras based on the composite rotation matrix and the composite intrinsic parameter matrix and on an individual rotation matrix and an individual intrinsic parameter matrix for the one of the plurality of cameras.

Such at least one machine-readable medium may comprise instructions that, in response to being executed on the computing device, cause the computing device to determine the composite intrinsic parameter matrix by determining an average of the individual intrinsic parameter matrices for each of the plurality of cameras.

Such at least one machine-readable medium may comprise instructions that, in response to being executed on the computing device, cause the computing device to generate a rectified image by rectifying an original image captured by one of the plurality of cameras using a rectification map corresponding to the one of the plurality of cameras.

Such at least one machine-readable medium may comprise instructions that, in response to being executed on the computing device, cause the computing device to determine coordinates in the original image that correspond to a pixel in the rectified image and determine a pixel value for the pixel in the rectified image by interpolating pixel values of two or more pixels in the original image, the two or more pixels selected based on the determined coordinates.

An apparatus may comprise a processor circuit and an imaging management module operative on the processor circuit to determine a composite rotation matrix for a camera array comprising a plurality of cameras, determine a composite intrinsic parameter matrix for the camera array, and compute one or more rectification maps for the camera array based on the composite rotation matrix and the composite intrinsic parameter matrix, each of the one or more rectification maps corresponding to one of the plurality of cameras.

With respect to such an apparatus, the imaging management module may be operative on the processor circuit to determine a composite orientation of the camera array according to a reference coordinate system based on a plurality of reference coordinates indicating the locations of a plurality of optical centers according to the reference coordinate system, each of the plurality of optical centers corresponding to a particular one of the plurality of cameras, and determine the composite rotation matrix for the camera array based on a difference between the composite orientation and a reference direction in the reference coordinate system.

With respect to such an apparatus, the camera array may comprise a two-dimensional (2D) camera array, and the imaging management module may be operative on the processor circuit to fit a plane to the plurality of optical centers based on the plurality of reference coordinates and define the composite orientation of the camera array as a direction in the reference coordinate system that is perpendicular to the plane.

With respect to such an apparatus, the imaging management module may be operative on the processor circuit to fit one or more lines to the plurality of optical centers, each of the one or more lines located in the plane and either parallel to or perpendicular to each other line among the one or more lines, and define an array coordinate system based on the one or more lines and the composite orientation of the camera array.

With respect to such an apparatus, the camera array may comprise a linear camera array, and the imaging management module may be operative on the processor circuit to fit a line to the plurality of optical centers based on the plurality of reference coordinates and define the composite orientation of the camera array as a direction in the reference coordinate system that is perpendicular to the line.

With respect to such an apparatus, the imaging management module may be operative on the processor circuit to determine an individual rotation matrix and an individual intrinsic parameter matrix for each of the plurality of cameras.

With respect to such an apparatus, the imaging management module may be operative on the processor circuit to compute a rectification map corresponding to one of the plurality of cameras based on the composite rotation matrix and the composite intrinsic parameter matrix and on an individual rotation matrix and an individual intrinsic parameter matrix for the one of the plurality of cameras.

With respect to such an apparatus, the imaging management module may be operative on the processor circuit to determine the composite intrinsic parameter matrix by determining an average of the individual intrinsic parameter matrices for each of the plurality of cameras.

With respect to such an apparatus, the imaging management module may be operative on the processor circuit to generate a rectified image by rectifying an original image captured by one of the plurality of cameras using a rectification map corresponding to the one of the plurality of cameras.

With respect to such an apparatus, the imaging management module may be operative on the processor circuit to determine coordinates in the original image that correspond to a pixel in the rectified image and determine a pixel value for the pixel in the rectified image by interpolating pixel values of two or more pixels in the original image, the two or more pixels selected based on the determined coordinates.

A method may comprise determining, by a processor circuit, a composite rotation matrix for a camera array comprising a plurality of cameras, determining a composite intrinsic parameter matrix for the camera array, and computing one or more rectification maps for the camera array based on the composite rotation matrix and the composite intrinsic parameter matrix, each of the one or more rectification maps corresponding to one of the plurality of cameras.

Such a method may comprise determining a composite orientation of the camera array according to a reference coordinate system based on a plurality of reference coordinates indicating the locations of a plurality of optical centers according to the reference coordinate system, each of the plurality of optical centers corresponding to a particular one of the plurality of cameras, and determining the composite rotation matrix for the camera array based on a difference between the composite orientation and a reference direction in the reference coordinate system.

With respect to such a method, the camera array may comprise a two-dimensional (2D) camera array, and determining the composite rotation matrix of the camera array may comprise fitting a plane to the plurality of optical centers based on the plurality of reference coordinates, fitting one or more lines to the plurality of optical centers, each of the one or more lines located in the plane and either parallel to or perpendicular to each other line among the one or more lines, defining the composite orientation of the camera array as a direction in the reference coordinate system that is perpendicular to the plane, and defining an array coordinate system based on the one or more lines and the composite orientation of the camera array.

With respect to such a method, the camera array may comprise a linear camera array, and determining the composite orientation of the camera array may comprise fitting a line to the plurality of optical centers based on the plurality of reference coordinates and defining the composite orientation of the camera array as a direction in the reference coordinate system that is perpendicular to the line.

Such a method may comprise determining an individual rotation matrix and an individual intrinsic parameter matrix for each of the plurality of cameras and computing a rectification map corresponding to one of the plurality of cameras based on the composite rotation matrix and the composite intrinsic parameter matrix and on an individual rotation matrix and an individual intrinsic parameter matrix for the one of the plurality of cameras.

Such a method may comprise determining the composite intrinsic parameter matrix by determining an average of the individual intrinsic parameter matrices for each of the plurality of cameras.

A system may comprise a processor circuit, a camera array comprising a plurality of cameras, and an imaging management module operative on the processor circuit to determine a composite rotation matrix for the camera array, determine a composite intrinsic parameter matrix for the camera array, and compute one or more rectification maps for the camera array based on the composite rotation matrix and the composite intrinsic parameter matrix, each of the one or more rectification maps corresponding to one of the plurality of cameras.

With respect to such a system, the imaging management module may be operative on the processor circuit to determine a composite orientation of the camera array according to a reference coordinate system based on a plurality of reference coordinates indicating the locations of a plurality of optical centers according to the reference coordinate system, each of the plurality of optical centers corresponding to a particular one of the plurality of cameras, and determine the composite rotation matrix for the camera array based on a difference between the composite orientation and a reference direction in the reference coordinate system.

With respect to such a system, the imaging management module may be operative on the processor circuit to fit a plane to the plurality of optical centers based on the plurality of reference coordinates, fit one or more lines to the plurality of optical centers, each of the one or more lines located in the plane and either parallel to or perpendicular to each other line among the one or more lines, define the composite orientation of the camera array as a direction in the reference coordinate system that is perpendicular to the plane, and define an array coordinate system based on the one or more lines and the composite orientation of the camera array.

With respect to such a system, the imaging management module may be operative on the processor circuit to determine an individual rotation matrix and an individual intrinsic parameter matrix for each of the plurality of cameras and compute a rectification map corresponding to one of the plurality of cameras based on the composite rotation matrix and the composite intrinsic parameter matrix and on an individual rotation matrix and an individual intrinsic parameter matrix for the one of the plurality of cameras.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:
   determine a composite orientation of a two-dimensional (2D) camera array according to a reference coordinate system, the 2D camera array to comprise a plurality of cameras organized into multiple rows and multiple columns;
   determine a composite rotation matrix for the 2D camera array based on a difference between the composite orientation and a reference direction in the reference coordinate system;
   determine a composite intrinsic parameter matrix for the 2D camera array;
   compute one or more rectification maps for the 2D camera array, each of the one or more rectification maps to be determined based on the composite rotation matrix for the 2D camera array, the composite intrinsic parameter matrix for the 2D camera array, and an individual rotation matrix for a respective one of the plurality of cameras;
   generate a rectified image by rectifying an original image captured by one of the plurality of cameras using a rectification map corresponding to the one of the plurality of cameras; and
   display the generated rectified image on a display device.

2. The at least one non-transitory machine-readable medium of claim 1, comprising instructions that, in response to being executed on the computing device, cause the computing device to:
   determine the composite orientation of the 2D camera array based on a plurality of reference coordinates, each reference coordinate to indicate a location of an optical center of a respective one of the plurality of cameras according to the reference coordinate system.

3. The at least one non-transitory machine-readable medium of claim 2, determining the composite orientation of the 2D camera array comprising:
   fitting a plane to the plurality of reference coordinates; and defining the composite orientation of the 2D camera array as a direction in the reference coordinate system that is perpendicular to the plane.

4. The at least one non-transitory machine-readable medium of claim 3, comprising instructions that, in response to being executed on the computing device, cause the computing device to:
fit one or more lines to the plurality of reference coordinates, each of the one or more lines located in the plane and either parallel to or perpendicular to each other line among the one or more lines; and
define an array coordinate system based on the one or more lines and the composite orientation of the 2D camera array.

5. The at least one non-transitory machine-readable medium of claim 1, comprising instructions that, in response to being executed on the computing device, cause the computing device to determine an individual rotation matrix and an individual intrinsic parameter matrix for each of the plurality of cameras.

6. The at least one non-transitory machine-readable medium of claim 5, each of the one or more rectification maps to be determined based on the composite rotation matrix for the 2D camera array, the composite intrinsic parameter matrix for the 2D camera array, and on individual rotation and intrinsic parameter matrices for a respective one of the plurality of cameras.

7. The at least one non-transitory machine-readable medium of claim 1, comprising instructions that, in response to being executed on the computing device, cause the computing device to determine the composite intrinsic parameter matrix by determining an average of individual intrinsic parameter matrices for each of the plurality of cameras.

8. The at least one non-transitory machine-readable medium of claim 1, comprising instructions that, in response to being executed on the computing device, cause the computing device to:
determine coordinates in the original image that correspond to a pixel in the rectified image; and
determine a pixel value for the pixel in the rectified image by interpolating pixel values of two or more pixels in the original image, the two or more pixels selected based on the determined coordinates.

9. An apparatus, comprising:
a processor circuit including an imaging management module to:
determine a composite orientation of a two-dimensional (2D) camera array according to a reference coordinate system, the 2D camera array to comprise a plurality of cameras organized into multiple rows and multiple columns;
determine a composite rotation matrix for the 2D camera array based on a difference between the composite orientation and a reference direction in the reference coordinate system;
determine a composite intrinsic parameter matrix for the 2D camera array;
compute one or more rectification maps for the 2D camera array, each of the one or more rectification maps to be determined based on the composite rotation matrix for the 2D camera array, the composite intrinsic parameter matrix for the 2D camera array, and an individual rotation matrix for a respective one of the plurality of cameras;
generate a rectified image by rectifying an original image captured by one of the plurality of cameras using a rectification map corresponding to the one of the plurality of cameras; and
display the generated rectified image on a display device.

10. The apparatus of claim 9, the imaging management module to:
determine the composite orientation of the 2D camera array based on a plurality of reference coordinates, each reference coordinate to indicate a location of an optical center of a respective one of the plurality of cameras according to the reference coordinate system.

11. The apparatus of claim 10, the imaging management module to:
fit a plane to the plurality of reference coordinates; and
define the composite orientation of the 2D camera array as a direction in the reference coordinate system that is perpendicular to the plane.

12. The apparatus of claim 11, the imaging management module to:
fit one or more lines to the plurality of reference coordinates, each of the one or more lines located in the plane and either parallel to or perpendicular to each other line among the one or more lines; and
define an array coordinate system based on the one or more lines and the composite orientation of the 2D camera array.

13. The apparatus of claim 9, the imaging management module to determine an individual rotation matrix and an individual intrinsic parameter matrix for each of the plurality of cameras.

14. The apparatus of claim 13, each of the one or more rectification maps to be determined based on the composite rotation matrix for the 2D camera array, the composite intrinsic parameter matrix for the 2D camera array, and on individual rotation and intrinsic parameter matrices for a respective one of the plurality of cameras.

15. The apparatus of claim 9, the imaging management module to determine the composite intrinsic parameter matrix by determining an average of individual intrinsic parameter matrices for each of the plurality of cameras.

16. The apparatus of claim 9, the imaging management module to:
determine coordinates in the original image that correspond to a pixel in the rectified image; and
determine a pixel value for the pixel in the rectified image by interpolating pixel values of two or more pixels in the original image, the two or more pixels selected based on the determined coordinates.

17. A method, comprising:
determining, by a processor circuit, a composite orientation of a two-dimensional (2D) camera array according to a reference coordinate system, the 2D camera array to comprise a plurality of cameras organized into multiple rows and multiple columns;
determining a composite rotation matrix for the 2D camera array based on a difference between the composite orientation and a reference direction in the reference coordinate system;
determining a composite intrinsic parameter matrix for the 2D camera array;
computing one or more rectification maps for the 2D camera array, each of the one or more rectification maps to be determined based on the composite rotation matrix for the 2D camera array, the composite intrinsic parameter matrix for the 2D camera array, and an individual rotation matrix for a respective one of the plurality of cameras;

generating a rectified image by rectifying an original image captured by one of the plurality of cameras using a rectification map corresponding to the one of the plurality of cameras; and displaying the generated rectified image on a display device.

18. The method of claim 17, comprising:

determining the composite orientation of the 2D camera array based on a plurality of reference coordinates, each reference coordinate to indicate a location of an optical center of a respective one of the plurality of cameras according to the reference coordinate system.

19. The method of claim 18, determining the composite rotation matrix of the 2D camera array comprising:

fitting a plane to the plurality of reference coordinates;

fitting one or more lines to the plurality of reference coordinates, each of the one or more lines located in the plane and either parallel to or perpendicular to each other line among the one or more lines;

defining the composite orientation of the 2D camera array as a direction in the reference coordinate system that is perpendicular to the plane; and defining an array coordinate system based on the one or more lines and the composite orientation of the 2D camera array.

20. The method of claim 17, comprising:

determining an individual rotation matrix and an individual intrinsic parameter matrix for each of the plurality of cameras; and computing each of the one or more rectification maps based on the composite rotation matrix for the 2D camera array, the composite intrinsic parameter matrix for the 2D camera array, and on individual rotation and intrinsic parameter matrices for a respective one of the plurality of cameras.

21. The method of claim 17, comprising determining the composite intrinsic parameter matrix by determining an average of individual intrinsic parameter matrices for each of the plurality of cameras.

22. A system, comprising:

a processor circuit;

a two-dimensional (2D) camera array comprising a plurality of cameras organized into multiple rows and columns; and a processing circuit including an imaging management module to:

determine a composite orientation of the 2D camera array according to a reference coordinate system;

determine a composite rotation matrix for the 2D camera array based on a difference between the composite orientation and a reference direction in the reference coordinate system;

determine a composite intrinsic parameter matrix for the 2D camera array;

compute one or more rectification maps for the 2D camera array, each of the one or more rectification maps to be determined based on the composite rotation matrix for the 2D camera array, the composite intrinsic parameter matrix for the 2D camera array, and an individual rotation matrix for a respective one of the plurality of cameras;

generate a rectified image by rectifying an original image captured by one of the plurality of cameras using a rectification map corresponding to the one of the plurality of cameras; and display the generated rectified image on a display device.

23. The system of claim 22, the imaging management module to:

determine the composite orientation of the 2D camera array based on a plurality of reference coordinates, each reference coordinate to indicate a location of an optical center of a respective one of the plurality of cameras according to the reference coordinate system.

24. The system of claim 23, the imaging management module to:

fit a plane to the plurality of reference coordinates;

fit one or more lines to the plurality of reference coordinates, each of the one or more lines located in the plane and either parallel to or perpendicular to each other line among the one or more lines;

define the composite orientation of the 2D camera array as a direction in the reference coordinate system that is perpendicular to the plane; and define an array coordinate system based on the one or more lines and the composite orientation of the 2D camera array.

25. The system of claim 22, the imaging management module to:

determine an individual rotation matrix and an individual intrinsic parameter matrix for each of the plurality of cameras; and compute each of the one or more rectification maps based on the composite rotation matrix for the 2D camera array, the composite intrinsic parameter matrix for the 2D camera array, and on individual rotation and intrinsic parameter matrices for a respective one of the plurality of cameras.

* * * * *